United States Patent [19]

Nishikawa et al.

[11] 4,138,372

[45] Feb. 6, 1979

[54] RESIN COMPOSITIONS CONTAINING POLYEPOXIDES AND URETDIONES

[75] Inventors: Akio Nishikawa, Hitachi; Hitoshi Yokono, Katsuta; Ryuichi Simizu, Hitachiohta; Junji Mukai, Hitachi, all of Japan

[73] Assignee: Hitachi, Ltd., Japan

[21] Appl. No.: 650,066

[22] Filed: Jan. 19, 1976

[30] Foreign Application Priority Data

Feb. 7, 1975 [JP] Japan ................................. 50-15393

[51] Int. Cl.$^2$ ............................................. C08G 59/40
[52] U.S. Cl. ........................................ 528/45; 528/46; 528/67; 528/73
[58] Field of Search ........ 260/47 EN, 47 EC, 59 EP, 260/77.5 R, 78.3 R, 78.41, 2 N, 2 EC

[56] References Cited

U.S. PATENT DOCUMENTS

| | | | |
|---|---|---|---|
| 2,977,370 | 3/1961 | Oken | 260/307 |
| 3,168,483 | 2/1965 | Beitchman et al. | 252/426 |
| 3,494,888 | 2/1970 | McElroy | 260/47 |
| 3,859,379 | 1/1975 | Kitamura | 260/831 |
| 3,909,480 | 9/1975 | Ogata et al. | 260/37 EP |

OTHER PUBLICATIONS

Rose, "Condensed Chemical Dictionary", 7th Ed., 1966, Reinhold Publishing, N.Y., p. 187.

*Primary Examiner*—Harold D. Anderson
*Assistant Examiner*—E. A. Nielsen
*Attorney, Agent, or Firm*—Craig & Antonelli

[57] ABSTRACT

A polymerizable, curable resin composition suitable for molding materials, prepreg, powdery paint materials or the like, which comprises a polyepoxide, a uretdione and a tetraphenyl borate-amine complex. This composition has long pot life and good curability by virtue of latent catalytic characteristics of the complex.

16 Claims, No Drawings

RESIN COMPOSITIONS CONTAINING POLYEPOXIDES AND URETDIONES

BACKGROUND OF THE INVENTION

The present invention relates to resin compositions having long pot life and good curability which comprise polyepoxides, uretdiones and tetraphenyl borate-amine complexes. The present invention also relates to thermoset resins having isocyanurate rings and oxazolidone rings in the structure which are obtained by curing the resin compositions.

With an increase in capacity of electrical apparatus and electronic devices and the demands on small-sized apparatus including the need for high reliability, heat resistant, electrical insulating materials for such apparatus and devices are becoming more and more important. Hetero-ring polymers such as polyimides are known as heat resistant resins. Since most of the conventional hetero-ring polymers were the condensation-polymerization type, which evolve volatile substances upon curing or polymerization, moldability thereof was not good and such polymers were considered as improper for molding, laminating or powder materials.

Silicone resins, another type of a heat resistant resin, have unsatisfactory mechanical strength at high temperatures and have disadvantages such as poor adhesiveness, large water permeability, etc. Applications of conventional silicone resins have necessarily been limited, accordingly.

On the other hand, there have been developed thermosetting resin compositions of the addition polymerization type which comprise polyepoxides and polyisocyanates as disclosed in British patent specification Nos. 843,841; 840,318; 989,390; 982,933; 883,994; and 763,347 and in U.S. Pat. No. 2,594,979. These addition-polymerization type thermosetting resin compositions have eliminated some of the above-mentioned problems, but there was a serious problem that since polyisocyanates are apt to react with water in the atmosphere, the compositions change in their charcteristics at low temperatures such as room temperature and thereby exhibit poor pot life.

U.S. Pat. No. 3,494,888 discloses polymerizable, curable resin compositions comprising an isocyanate-bearing polyisocyanate polymer which has either an isocyanurate ring or a uretdione ring, or both, and a polyepoxide monomer or polymer. According to the disclosure of this patent, the compositions can be cured by heating to temperatures above 200° C. without any additional curing agent, and can also be cured with only short exposure to a higher temperature when polyol or aromatic diamine curing agents are used. These thermosetting resin compositions can generally produce resins which exhibit good heat resistance properties. Various curing agents and curing catalysts are disclosed. From the practical point of view, a curing agent or catalyst is necessary to cure the compositions without exposure to excessive high temperatures for a long period of time. However, a series of experiments by the present inventors have revealed that the compositions disclosed in this patent which contain different types of amines as a catalyst or curing agent showed unsatisfactory pot life in the presence of moisture. It can be said that in this U.S. patent which employs a polyisocyanate polymer having isocyanurate rings or uretdione rings, the resin composition itself has improved pot life, compared with the conventional compositions containing monomeric polyisocyanates because the number of free isocyanate groups in the former is smaller than that in the latter. However, if the composition comprising polyepoxides and uretdiones is admixed with the amine catalysts disclosed, the composition loses pot life in short period of time in the presence of moisture. The mechanism of this phenomenon has not been fully elucidated. However, it can be speculated that dissociation of a uretdione ring of the uretdione compound is accelerated by the conventional amines at lower temperatures thereby increasing the number of isocyanate groups. As a result, the isocyanate groups react with moisture in the atmosphere.

SUMMARY OF THE INVENTION

Accordingly, it is an object of the present invention to provide a curing catalyst or curing agent suitable for compositions containing polyepoxides and uretdione compounds.

It is another object of the present invention to provide polymerizable resin compositions comprising polyepoxide and uretdione compounds, which have remarkably improved pot life and good curability.

It is still another object to provide polymerizable, curable compositions containing polyepoxides, uretdione compounds and specific curing catalysts or curing agents which can produce thermoset resins having good heat resistance properties and good mechanical and electrical properties.

The present invention is based upon the discovery that a series of tetraphenyl borate-amine complexes exhibit excellent latent catalytic characteristics with respect to compositions containing polyepoxides and uretdione compounds. The compositions according to the present invention show little or no change in viscosity during storing thereof at room temperature for a long period of time, since the tetraphenyl borateamine complexes used in the invention have substantially no reactivity with either polyepoxides or uretdione compounds at temperatures lower than their melting points. When the compositions are exposed to temperature higher than the melting points of the tetraphenyl borate-amine complexes, the compositions show good curability.

U.S. Pat. No. 3,494,888 discloses the use of boron trifluorideamine complexes which dissociate at temperatures from 60° to 300° C. The inventors' experiments revealed that mixtures of polyepoxides, uretdione and commercially available boron trifluoride-amine complexes showed unsatisfactory pot-life. Although the characteristics of boron trifluoride-amine complexes and the tetraphenyl borate-amine complexes are common in some aspects, latent catalytic characteristics therebetween are considerably different. The inventors have not elucidated the mechanisms of curing in the two catalysts; however, it is pointed out that a steric obstacle effect of tetraphenyl borate-amine complexes sufficiently prevents them from reacting with polyepoxides and uretdione compounds at low temperatures whilst the boron trifluoride amine complexes have a less steric obstacle effect.

The above-mentioned objects and other objects and features of the invention will be apparent from the following detailed description.

DETAILED DESCRIPTION OF THE INVENTION

In the present invention any known polyepoxides having at least two vicinal epoxy groups in the structure are used and are exemplified as follows:
diglycidylether of bisphenol A;
butadiene diepoxide;
3,4-epoxycyclohexylmethane-(3,4-epoxy)cyclohexane carboxylate;
vinyl cyclohexane dioxide;
4,4'-di(1,2-epoxyethyl)diphenylether;
4,4'-(1,2-epoxyethyl)biphenyl;
2,2'-bis(3,4-epoxycyclohexyl)propane;
diglycidylether of resorcinol;
diglycidylether of phloroglucinol
bis(2,3-epoxy cyclopentyl) ether;
2-(3,4-epoxy)cyclohexane-5,5'-spiro(3,4-epoxy)cyclohexane-m-dioxane;
bis-(3,4-epoxy-6-methylcyclohexyl)adipate;
N,N'-m-phenylene-bis(4,5-epoxy-1,2-cyclohexanedicarboxyimide);
hydantoin diepoxide;
triglycidylether of paraminophenol;
polyalylglycidylether;
1,3,5-tri(1,2-epoxyethyl) benzene;
2,2',4,4'-tetraglycidoxybenzophenone;
tetraglycidoxytetraphenyl urethane;
polyglycidylether of phenol-formaldehyde novolac;
triglycidylether of glycerine;
triglycidylether of trimethylolpropane; and
polyfunctional hydantoin compounds.

Among the epoxy resins preferable are diglycidylether of bisphenol A and polyglycidylether of phenol-formaldehyde novolac because of good reactivity with isocyanate groups at high temperatures in the presence of tetraphenylborate-amine complexes. As well known in the art, polyepoxides which have no or few hydroxyl groups are preferable because such polyepoxides have little reactivity with isocyanate groups at low temperatures. If polyepoxides contain many hydroxyl groups in the structure, the viscosity of the compositions becomes too high when the compositions are kneaded to blend the components at elevated temperatures such as 60° C. or 80° C. In addition, if hydroxyl group-rich polyepoxides are used, the cured resins obtained therefrom swell due to gas evolution and are deteriorated in heat resistance properties thereof. Therefore, polyepoxides which have substantially no or few hydroxyl groups should be used.

The molecular weight of polyepoxides used in the present invention may vary widely, because polyepoxides can be monomeric or polymeric in the invention. Preferably, the molecular weight is within a range of about 200 to about 6,000.

Various kinds of uretdione compounds and methods for making same are known and these are disclosed in U.S. Pat. Nos. 3,494,888; 3,108,100, and 2,977,370, etc. Uretdione compounds preferably used in the present invention can be represented by the following general formula:

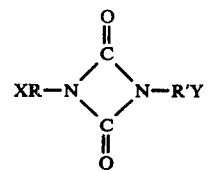

where R and R' are the same or different aromatic groups selected from the group consisting of

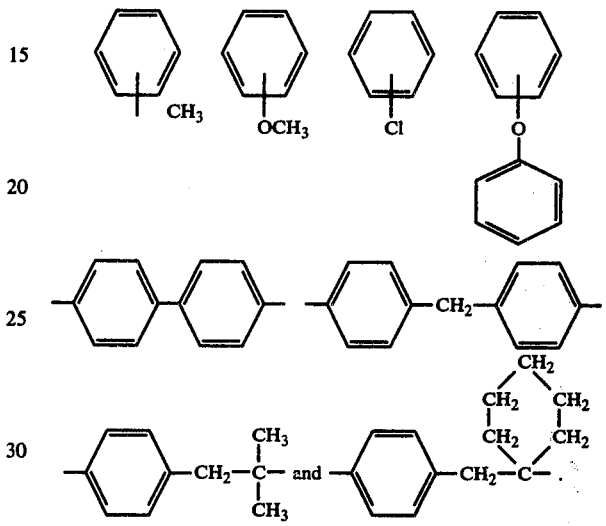

and X and Y are the same or different groups selected from the group consisting of hydrogen, $(NCO)_{1-3}$,

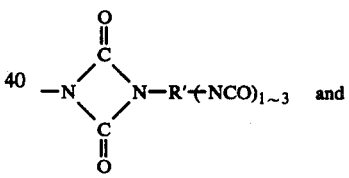 and

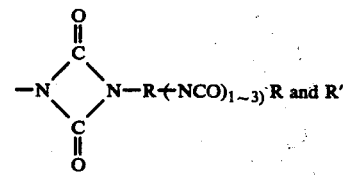 R and R' representing the same group heretofore described. These aromatic uretdiones can give cured resins better heat resistance properties than aliphatic uretdiones.

Among the uretdione compounds preferable are isocyanated terminated uretdiones, in other words uretdiones derived from polyisocyanates, because such uretdione compounds have good reactivity with polyepoxides and produce highly cross-linked cured resins with good heat resistant, and electrical and mechanical properties.

The molecular weight of the uretdione compounds may vary widely on applications of compositions and combination with polyepoxides, but preferably it ranges between about 200 and about 2,000. Examples of suitable uretdiones are as follows:
1,3-bis(3-isocyanate-o-tolyl)2,4-uretdione;
1,3-bis(3-isocyanate-p-tolyl)2,4-uretdione;

1,3-bis(3-isocyanate-4-methoxyphenyl)2,4-uretdione; and 1,3-bis[4-(4-isocyanate phenyl methyl) phenyl]2,4-uretdione.

The inventors have found that when a co-oligomer uretdione (which is produced by reacting two kinds of polyisocyanates) is used heat resistance properties of cured resins are further improved. An example of a co-oligomer uretdione is an adduct of 2,4-tolylenediisocyanate and diphenylmethane-4,4-diisocyanate. These uretdiones may be prepared in the conventional manner as disclosed in U.S. Pat. Nos. 3,108,100 and 3,168,483. The preparation process may be performed preferably at about room temperature in the presence of a suitable catalyst such as triethylamine, pyridine, N-methyl morphorine and the like.

Although the pot life of compositions of the invention is not affected by a mixing ratio of the polyepoxides and uretdione compounds, the curing speed of the compositions and properties of cured resins may vary on the mixing ratio. This mixing ratio may be chosen in accordance with the intended applications and the starting materials used.

Since the uretdione ring in the uretdione compound is dissociated upon heating to form isocyanate groups as follows:

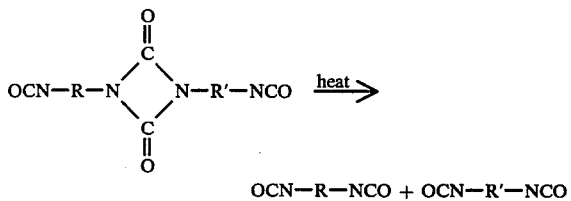

the resulting isocyanate groups react with each other to form an isocyanurate ring and, at the same time, isocyanate groups react with epoxy groups to form an oxazolidone ring, in the presence of tetraphenyl borate-amine complexes. Therefore, the mixing ratio of the uretdione compared to a polyepoxide is determined by relationship between isocyanate groups including groups formed upon dissociation of a uretdione ring and epoxy groups.

The mixing ratio may be expressed as an "equivalent ratio" of a uretdione compound to a polyepoxide and is designated by the following formula:

$$\frac{a \cdot m (n + 1)}{b \cdot p}$$

where
$a$ is the number of moles of a uretdione compound,
$b$ is the number of moles of a polyepoxide;
$m$ is the average number of isocyanate groups in one mole of an isocyanate compound forming the uretdione compound, and preferably it is of 2 to 4,
$n$ is the average number of uretdione ring in one mole of the uretdione, and preferably it is of 1 to 2, and
$p$ is the average number of epoxy groups in one mole of the polyepoxide.

According to experiments by the inventors, it was found that the equivalent ratio of a uretdione compound to a polyepoxide was preferably within a range of 0.8 to 4. When the ratio is smaller than 0.8, curability of compositions and heat resistance properties of cured resins are generally unsatisfactory due to an insufficient cross-linking effect by isocyanurate rings and oxazolidone rings. When the ratio exceeds 4, the flow property of the compositions becomes small and the properties of cured resins are not good. The most preferable range for the ratio is from 1 to 1.6, when the compositions are applied to a molding material.

In case uretdione compounds derived from polyisocyanates are used, the mixing ratio of the polyepoxide and uretdione compounds may be determined by the number of free isocyanate groups of a uretdione compound used and that of epoxy groups of a polyepoxide used. In this case, the ratio of the number of free isocyanate groups to that of epoxy groups is preferably within a range of 0.4 to 2 since the number of free isocyanate is at least 2 per mole of polyisocyanate used.

However, in the specification the mixing ratio is used hereinafter to mean "the equivalent ratio", unless otherwise indicated.

The present invention is characterized by the use of tetraphenyl borate-amine complexes as a curing catalyst or curing agent. Since it is difficult and not essential for understanding of the invention to define whether the tetraphenyl borate-amine complexes are curing catalysts or curing agents in the compositions of the invention, these complexes are hereinafter referred to as a curing catalyst.

Tetraphenyl borate-amine complexes or tetraphenyl borate complexes of organic nitrogen-containing compounds include tetraphenyl borate complexes of primary-, secondary-, tertiary- and quaternary amines, and also include tetraphenyl borate complexes of imidazoles.

Tetraphenyl borate-amine complexes preferably used in the present invention are represented by the following formulae:

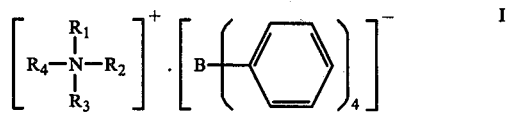

where at least one of groups $R_1$ to $R_4$ is an alkyl group having 1 to 20 carbon atoms and the remaining are hydrogen atoms;

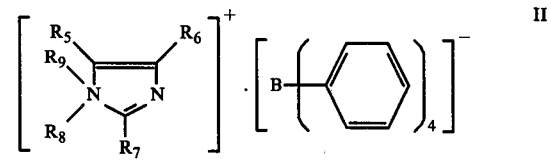

where at least one of the groups $R_5$ to $R_9$ is an alkyl group having 1 to 20 carbon atoms or a phenyl group and the remaining are hydrogen atoms;

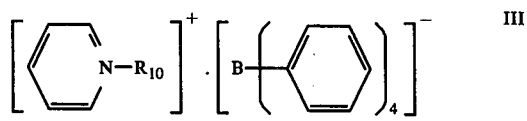

where $R_{10}$ is a hydrogen atom or an alkyl group having 1 to 20 carbon atoms;

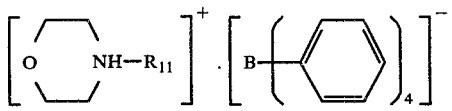

where $R_{11}$ is a hydrogen atom or an alkyl group having 1 to 20 carbon atoms.

Tetraphenylborates used in the invention are known and prepared by reacting alkali metal salts of tetraphenyl boron with an amine or a basic heterocyclic compound such as imidazoles, pyridine or morpholines in water or alcohol in the presence of or in the absence of an acid or halogenated alkyls. In more detail, a certain amount of an amine is dissolved in water or alcohol, and hydrochloric acid is added to the resulting solution to produce a chlorinate of the amine. Then an aqueous or alcoholic solution in which sodium tetraphenylboron is dissolved in an amount equimolar to the amine is added to the amine chlorinate solution to obtain a precipitate of a tetraphenyl borate-amine complex. The precipitate is filtered, washed with water or alcohol, and dried. Various kinds of tetraphenyl borate-amine complexes and methods of producing same are disclosed in U.S. Pat. No. 3,909,480.

In the following, an example of a method of preparing a tetraphenyl borate-amine complex is shown.

15 g of triethyl amine (0.149 mole) was dissolved in 1.4 liters of distilled water and 13 m liters of hydrochloric acid was added to the solution. 50 g of sodium tetraphenyl boron (0.146 mole) dissolved in 400 m. liters of water was added to the solution with stirring to obtain a white precipitate of triethylamine tetraphenyl borate. The precipitate was filtered, washed and dried in vacuo of $10^{-2}$ mm Hg at 400° C. for 3 hours to obtain 60.5 g of the tetraphenyl borate-amine complex, which has a melting point of 195° to 200° C.

Examples of suitable tetraphenyl borate-amine complexes are as follows:
triethylamine tetraphenyl borate;
morpholine tetraphenyl borate;
2-ethyl-4-methyl imidazole tetraphenyl borate;
2-methyl imidazole tetraphenyl borate; and
pyridine tetraphenyl borate.

Among the tetraphenyl borate-amine complexes especially suitable are tetraphenyl borate complexes of tertiary amines because these complexes give compositions good curability as well as good latent catalytic characteristics.

The molecular weight of the tetraphenyl borate-amine complexes is generally within a range of about 350 to about 1000. The tetraphenyl borate-amine complexes should have sufficiently high melting points, or else the complexes show reactivity with either uretdiones or polyepoxides, or both, at low temperatures thereby causing deterioration of the pot life of the composition. Excessively high melting points thereof are undesirable. The melting point thereof should be higher than a temperature at which compounding and kneading of the compositions are carried out. Since compounding and kneading are carried out at temperatures of about 60° to 80° C., in general, the melting point should be at least about 100° C. Preferably, it should be about 150° C. or more. On the other hand, the melting point should be lower than about 300° C. so that curing processes of the compositions is carried out without exposure to excessively high temperatures.

Though dissociation of uretdione rings takes place at about 170° C. in the absence of catalysts, the dissociation temperature is lowered to some extent by the tetraphenyl borate-amine complexes.

The resulting isocyanate groups react with each other to form an isocyanurate ring

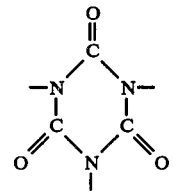

and at the same time, isocyanate groups react with epoxy groups to form an oxazolidone ring

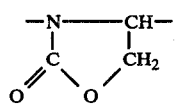

in the presence of amines that are formed by dissociation of the complexes. According to an infrared absorption spectrum with respect to the cured resin of the present invention, carbonyl absorption of uretdione rings at 1770 cm$^{-1}$ was not observed, but absorptions at 1710 to 1730 cm$^{-1}$ due to isocyanurate rings and oxazolidone rings were observed. The inventors also speculate that in addition to formation of isocyanurate and oxazolidone rings in the cured resins, curing reaction between epoxy groups takes place in the presence of the amines.

The isocyanurate rings and oxazolidone rings play a very important role to produce good heat resistant thermoset resins.

The tetraphenyl borate-amine complexes are preferably added in an amount of 0.01 to 10 percent by weight with respect to the total weight of polyepoxides and uretdione compounds used in the composition.

If the amount of tetraphenyl borate-amine complexes is less than 0.01 percent in the composition, curability of the composition is insufficient. On the other hand, when the amount of tetraphenyl borate-amine complexes exceeds 10 percent, a flow property of the composition will be lowered and the resulting cured resin will be deteriorated in mechanical and electrical and thermal characteristics. In this specification, however, an effective amount is used to mean that when the composition containing a polyepoxide, a uretdione and a tetraphenyl borate is exposed to a temperature higher than the melting point of the tetraphenyl borate-amine complex, the resulting amine cause reactions between isocyanate groups per se and between isocyanate groups and epoxy groups thereby effecting curing of the composition.

When the compositions are applied to molding in which a molding machine such as transfer molding machine is used, the compositions are kneaded by means of rolls, for instance, at 60° to 70° C. for five to 10 minutes, preferably, whereby a part of isocyanate groups react with each other or with epoxy groups thereby effecting semi-cure of the compositions. Molding is preferably carried out at 150° C. to 250° C. for one to five minutes. Then, the molded articles can be cured by heating to 150° C. to 250° C. for one to 24 hours.

Although the molding of the compositions may be carried out at the same temperatures as the curing temperatures, the molded articles are not cured completely since the heating time is very short. Therefore, the molded articles are semicured; that is, a part of isocyanate groups or uretdione rings are reacted with epoxy groups. These semicured resin compositions are widely called B-stage resins in the fields of prepregs for laminates and powder for molding and laminating materials. However, the compositions which are not subjected to kneading or semicuring may also be cured by heating to 150° C. to 250° C. for one to 24 hours.

The compositions of the invention are used as solventless or solvent type and are applied to powder for molding and paint and to varnishes for prepreg, laminate and adhesives. Various kinds of additives such as fillers, pigments, or the like can be added to the compositions.

The present invention will be illustrated by means of the following examples, but it should be noted that the limited number of examples are not shown to restrict the scope of the present invention.

EXAMPLE 1

Twelve kinds of polymerizable resin compositions were prepared as shown in Table 1. Test Nos. 1 through 6 contain various kinds of tetraphenyl borate-amine complexes, and Test Nos. 7 through 13 contain various kinds of conventionally known amines as curing catalysts or curing agents. The equivalent ratio of the uretdione compound used to the polyepoxide was 2.0.

A resin composition used in this example is as follows:

| | |
|---|---|
| Polyglycidylether of phenol-formaldehyde novolac (epoxy equivalent 225, molecular weight about 450, ECN 1273, manufactured by Ciba) | 100 g |
| 1,3-bis(3-isocyanate-p-tolyl)2,4-uretdione | 77 g |
| Mold separator (Wax, Hechst E., manufactured by Hechst Japan) | 4 g |
| Filler (quartz glass powder, 100–325 mesh) | 70 wt. %* |

*weight % with respect to the total weight of the polyepoxide and uretdione compound.

The compositions were admixed with the respective catalysts shown in Table 1, and kneaded by means of rolls at 80° C. for 10 minutes and then crushed to obtain molding powder compositions.

As is seen from Table 1, compositions of Test Nos. 1 through 6 which contain tetraphenyl borate-amine complexes, showed far longer pot life than other compositions of Test Nos. 7 through 13, which contain conventional amine compounds. Although in the latter group some of the amounts of the amine catalysts used are smaller than those of the complexes, pot life of the compositions containing the amines are shorter than that of the inventive compositions.

TABLE 1

| Test No. | Catalyst | Amount (phr)*2 | Pot Life |
|---|---|---|---|
| 1 | triethylamine tetraphenyl borate | 3 | more than 2 months |
| 2 | pyridine tetraphenyl borate | 3 | " |
| 3 | morpholine tetraphenyl borate | 3 | " |
| 4 | 2-ethyl-4-methylimidazole tetraphenyl borate | 3 | " |
| 5 | 2-ethyl-4-dimethylimidazole tetraphenyl borate | 3 | " |
| 6 | triethylene diamine | 1 | no pot life |
| 7 | pyridine | 0.5 | " |
| 8 | dimethylcyclohexyl amine | 1 | " |
| 9 | 2-methylimidazole | 1 | " |

TABLE 1-continued

| Test No. | Catalyst | Amount (phr)*2 | Pot Life |
|---|---|---|---|
| 10 | undecylimidazole | .1 | " |
| 11 | 1-cyamoethyl undecylimidazole | 3 | " |
| 12 | 1-azine-undecylimidazole | 3 | " |

*2parts by weight per 100 parts by weight of the polyepoxide and uretdione.

In Table 1, the term "no pot life" means that a value of spiral flow of respective compositions becomes smaller than 20 inches within one week after preparation of the compositions. The compositions of Test Nos. 1 through 5 kept a value of spiral flow larger than 20 inches for more than 2 months, however.

Since the commercially acceptable compositions are required to have pot life of at least one month, it is apparent that the inventive compositions have excellent pot life.

EXAMPLE 2 (Control)

Resin compositions were prepared each of which comprises a polyepoxide (100 g of polyglycidylether of phenol-formaldehyde used in Example 1), 3g of 2-ethyl-4-methyl imidazole azine adduct, 4 g of wax used in Example 1, 70% by weight of quartz glass powder used in Example 1, and 1,3-bis(3-isocyanate-o-toluyl)2,4-uretdione.

Amounts of uretdione were 38.5 g (the equivalent ratio of 1), 54g (1.5) and 77g (2.0), respectively. The resulting compositions were kneaded and crushed in the same manner as in Example 1 to obtain powdery compositions.

Melting viscosity changes of the powdery compositions in 75% relative humidity are shown in Table 2. The melting viscosity ($\mu$) was measured by using a Koh-ka flow tester in accordance with the following procedures:

(1) Placing 2 g of a sample (a composition) in a cylinder of a section area of 1 cm$^2$. The cylinder has a capillary nozzle of a diameter (2 $\gamma$) of 1 mm and of a length (1) of 10 mm at the bottom thereof.

(2) Heating the cylinder to 150° C.

(3) Pressing down a piston with a pressure (P) of 10 Kg/cm$^2$ in the cylinder so that the melted sample is extruded through the nozzle at a certain speed.

Melting viscosity is calculated from the maximum flow speed (Qcm/sec) of the melted sample in accordance with the formula:

$$\eta = P\ \pi\gamma^4/8\ 1/Q$$

In Table 2, there is shown a melting viscosity change (Test No. 4) of a composition comprising monomeric diphenylmethane diisocyanate in place of uretdione.

TABLE 2

| Test No. | Equivalent Ratio | Melting Initial | Viscosity After 3 days | (poise) After 7 days | at 150° C. After 15 days |
|---|---|---|---|---|---|
| 1 | 1 | 120 | 110 | 120 | 120 |
| 2 | 1.5 | 430 | 450 | 500 | 630 |
| 3 | 2.0 | 1600 | 1420 | 1800 | 2500 |
| 4 | 2.0 | 30 | 1700 | not measurable | |

Though the compositions of Test Nos. 1, 2 and 3 are more stable than Test No. 4 composition in the presence of moisture, there is a tendency that the viscosity increases gradually. This fact means that 2-ethyl-4-methylimidazole is not a good catalyst for the compositions which require long pot life. It was further found that pot life of the composition of Test Nos. 3 and 4 was less than 21 days; therefore such compositions are unsatisfactory for practical use.

According to other experiments by the inventors, when 2-azineundecylimidazole (melting point 187°–188° C.) was used as a catalyst for a composition of the polyepoxide and uretdione used in this Example, pot life was only 21 days notwithstanding its high melting point, and appearance of the cured resin was not good.

Therefore, excellent catalytic functions of tetraphenyl borate-amine complexes used in the invention are not based only upon their higher melting points but upon their chemical or physico-chemical properties, though the inventors have not elucidated the reasons why only the tetraphenyl borate-amine complexes bring about best results, among amine complexes.

EXAMPLE 3

Six kinds of resin compositions were prepared by using the same polyepoxide and uretdione in the same manner as in Example 1. For the purpose of comparison with the inventive compositions, another composition (Test No. 7) containing monomeric naphthalene diisocyanate in place of the uretdione was prepared in the same manner as in Example 1. To each of mixtures of the polyepoxide and uretdione was added 3 g of triethylamine tetraphenyl borate, 3 g of wax used in Example 1, and 70% by weight of quartz glass powder used in Example 1. Amounts of the uretdione were 31g, 46.4 g, 62 g, 72 g, 116 g, and 154 g per 100 g of the polyepoxide, and therefore the equivalent ratios of the uretdione to the polyepoxide were 0.8, 1.2, 1.6, 2.0, 3.0, and 4.0, respectively.

The equivalent ratio of naphthalene diisocyanate to the polyepoxide was 1.3.

Melting viscosity changes of these compositions are shown in Table 3 below.

TABLE 3

| Test No. | Equivalent Ratio | Melting Initial | Viscosity After 3 days | (poise) After 7 days | at 150° C. After 15 days |
|---|---|---|---|---|---|
| 1 | 0.8 | 70 | 70 | 70 | 70 |
| 2 | 1.2 | 150 | 150 | 150 | 150 |
| 3 | 1.6 | 650 | 650 | 650 | 650 |
| 4 | 2.0 | 1100 | 1100 | 1100 | 1100 |
| 5 | 3.0 | 1800 | 1800 | 1800 | 1800 |
| 6 | 4.0 | 2500 | 2500 | 2500 | 2500 |
| 7 | 1.3 | 150 | 2000 | not measurable | |

As is seen from Table 3, there is no change in viscosity of the inventive compositions, while composition of Test No. 7 showed a great increase in viscosity in 3 days. Therefore, it is apparent that the compositions of the invention have excellent stability to moisture.

When the compositions of Test Nos. 1, 2, 3, 4 and 7 were heated to a temperature of 170° C. for 3 minutes, the following $CO_2$ gas evolutions were observed, as shown in Table 4.

TABLE 4

| Test No. | $CO_2$ (cc/10 g of composition) |
|---|---|
| 1 | 0.059 |
| 2 | 0.085 |
| 3 | 0.070 |
| 4 | 0.063 |
| 7 | 0.650 |

Since $CO_2$ gas may be causes of swelling, voids and pinholes of cured resins, the small $CO_2$ gas evolution of the inventive compositions is the very important characteristic for the practical use.

Further, the compositions of Test Nos. 2, 3 and 4 were molded at 170° C. for 3 minutes under 100 psi and cured by heating to a temperature of 180° C. for 15 hours to make specimens for bending test. Bending strength ($Kg/cm^2$) at 180° C. of the specimens are shown in Table 5 below.

TABLE 5

| | Bending strength ($Kg/cm^2$) | | | |
|---|---|---|---|---|
| Test No. | Initial | After 7 days | After 15 days | After 30 days |
| 2 | 450 | 470 | 460 | 440 |
| 3 | 580 | 590 | 570 | 565 |
| 4 | 680 | 670 | 690 | 680 |

Further, the inventors measured heat distortion temperatures (HDT, ° C.), glass transition temperatures (Tg, ° C.), and dielectric dissipation (tan δ,% under 1 MHz) of the specimens of Test Nos. 2 through 6. The data are shown in Table 6 below:

TABLE 6

| Test No. | HDT(° C.) | Tg(° C.) | Tan δ (%) under 1 MHz |
|---|---|---|---|
| 2 | higher than 200° C. | 171 | 0.8 |
| 3 | " | 183 | 0.8 |
| 4 | " | 194 | 0.7 |
| 5 | " | 177 | 0.9 |
| 6 | " | 156 | 1.0 |

EXAMPLE 4 (Control)

Three kinds of resin compositions were prepared each of which contains 100 g of polyglycidylether of tetraphenylethane (epoxy equivalent 210 - 240), one gram of 2-azine-undecylimidazole, 4g of wax used in Example 1, 70% by weight of quartz glass powder used in Example 1 and the uretdione used in Example 1. Amounts of uretdione used are 38g, 54g, and 77g, respectively.

The compositions were kneaded by means of rolls at 90° C. for 5 minutes, and crushed to obtain powdery compositions. The resulting compositions were molded at 170° C. for 3 minutes under a pressure of 1000 psi and cured by heating to a temperature to 180° C. for 15 hours to make test pieces (13 mm × 15 mm × 125 mm).

The test pieces were left to stand in a constant temperature bath being kept at 225° C. for 30 days, and glass transition temperatures, bending strength at 180° C. and dielectric dissipation of the test pieces were measured. The data are shown in Table 7 below:

TABLE 7

| Test No. | Equivalent Ratio | Tg(° C.) | Bending Strength ($Kg/cm^2$) | tan δ under 1 MHz Under normal condition | After PCT[*3] |
|---|---|---|---|---|---|
| 1 | 1.0 | 173 | 522 | 0.8 | 1.9 |
| 2 | 1.4 | 185 | 675 | 0.8 | 1.9 |
| 3 | 2.0 | 199 | 633 | 0.9 | 2.0 |

[*3] the specimens were heated by steam of 120° C. under a pressure of 2 atm. for 200 hours.

Though the cured resins of the compositions containing 2-azine-undecylimidazole exhibit substantially the same glass transition temperatures, bending strengths, and dielectric dissipation as those of the inventive compositions, these compositions required a high molding pressure and a higher kneading temperature because such compositions had a poorer flow property than the inventive compositions did.

EXAMPLE 5

Five kinds of compositions were prepared each of which comprises 100 g of epoxy resin used in Example 1, 3g of triethylamine tetraphenyl borate, 4 g of wax used in Example 1 and 70% by weight of quartz glass powder used in Example 1. Different amounts of the uretdione shown in Table 8 below were added to the respective compositions. The resulting compositions were kneaded and crushed in the same manner as in Example 1 to obtain powdery compositions.

The compositions were respectively molded at 170° C. for 3 minutes under a pressure of 100 psi and cured by heating to a temperature of 180° for 15 hours to make test pieces. Properties of the resulting test pieces are shown in Table 8 below:

TABLE 8

| Test No. | Equivalent Ratio | Tg(° C.) | Bending strength (Kg/cm$^2$) Initial | Bending strength (Kg/cm$^2$) after heating*[4] | tan δ (%) under 1 MHz under normal condition | tan δ (%) under 1 MHz PCT*[5] |
|---|---|---|---|---|---|---|
| 1 | 1 | 168 | 575 | 550 | 0.8 | 1.9 |
| 2 | 1.4 | 173 | 632 | 615 | 0.8 | 1.8 |
| 3 | 2.0 | 191 | 655 | 680 | 0.8 | 1.9 |
| 4 | 3.0 | 180 | 510 | 573 | 0.8 | 2.0 |
| 5 | 4.0 | 159 | 435 | 530 | 0.9 | 2.1 |

*[4] the test pieces were heated to a temperature of 225° C. for 30 days.
*[5] the same as in Table 7.

EXAMPLE 6

Three kinds of resin compositions were prepared each of which comprises 100 g of polyepoxide used in Example 1, 3g of triethylamine tetraphenyl borate, 3g of wax used in Example 1, 70% by weight of quartz glass powder used in Example 1. Different amounts of uretdiones which are co-oligomers of diphenyl methane-4,4′ diisocyanate (MDI) and 2, 4-tolylene diisocyanate (IDI) in the weight ratios of 10/90, 20/80, and 30/70 were added to the compositions in the amounts of 54g of 10/90 co-oligomer, 56 grams of 20/80 co-oligomer and 61 grams of 30/70 co-oligomer.

The compositions were kneaded and crushed in the same manner as in Example 1, and test pieces of them were made in the same manner as in Example 3. Data with respect to bending strength (Kg/cm$^2$) and glass transition temperatures (Tg, ° C.) of the test pieces are shown in Table 9 below.

TABLE 9

| Test No. | MDI/TDI | Bending strength (Kg/cm$^2$) at 180° C. Initial | Bending strength (Kg/cm$^2$) at 180° C. After 60 days | Tg(° C.) |
|---|---|---|---|---|
| 1 | 10/90 | 520 | 520 | higher than 200 |
| 2 | 20/80 | 690 | 690 | " |
| 3 | 30/70 | 650 | 650 | " |

The glass transition temperatures (Tg) of the cured resins of this example are considerably higher than those shown in Tables 6, 7 and 8. That is, the cured resins having higher glass transition temperatures can be obtained by using co-oligomers of two or more kinds of isocyanates.

What is claimed is:

1. A resin composition comprising a polyepoxide having at least two vicinal epoxy groups, a uretdione compound having at least one uretdione ring in its structure, and an effective amount of a tetraphenyl borate-amine complex for effecting dissociation of said uretdione ring at a temperature above the melting point of the complex and for effecting reaction between isocyanate groups formed by the dissociation and between the isocyanate groups and epoxy groups, thereby to form an isocyanurate ring and oxazolidone ring in a cured resin of said composition.

2. A resin composition according to claim 1, wherein said tetraphenyl borate-amine complex is a member selected from the group consisting of tetraphenyl borate complexes of primary-, secondary-, tertiary-, and quarternary amines and tetraphenyl borate complexes of imidazoles and pyridines and morpholines.

3. A resin composition according to claim 1, wherein said tetraphenyl borate-amine complex has a melting point higher than 100° C. but lower than 300° C.

4. A resin composition according to claim 1, wherein the tetraphenyl borate-amine complex has a molecular weight of about 350 to about 1,000.

5. A resin composition according to claim 1, wherein an amount of said tetraphenyl borate-amine complex is from 0.01 to 10 weight percent by the total weight of said polyepoxide and uretdione compound.

6. A resin composition according to claim 2, wherein said tetraphenyl borate-amine complex is a tetraphenyl borate-tertiary amine complex.

7. A resin composition according to claim 1, wherein the equivalent ratio of said uretdione to said polyepoxide is of 0.8 to 4.

8. A resin composition according to claim 1, wherein the uretdione has at least one isocyanate terminal group and is represented by the following formula:

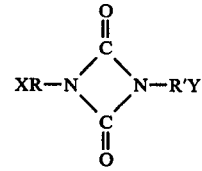

where R and R′ which are the same or different are aromatic groups and X and Y which are the same or different are

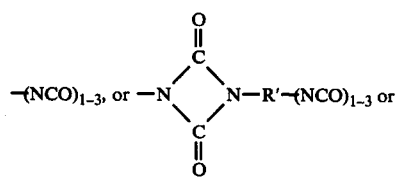

-continued

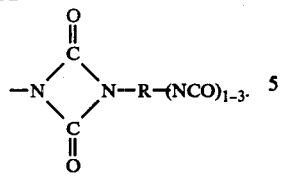

9. A resin composition according to claim 1, wherein said polyepoxide has a molecular weight of about 200 to about 6,000, and said uretdione compound has a molecular weight of from about 200 to about 2,000.

10. A resin composition according to claim 1, wherein said uretdione is a co-oligomer derived from two kinds of polyisocyanates.

11. A thermosetting, curable resin composition a part of which is reacted by heating the composition of claim 1 at a temperature at which a part of the uretdione rings of said uretdione compound is dissociated to react with said epoxy groups, while other uretdione rings and epoxy groups remain unreacted.

12. A thermosetting, curable resin composition according to claim 11, wherein the composition is heated to a temperature of 150° C. to 250° C. for a period of time whereby part of said composition is cured.

13. A thermosetting, curable resin composition a part of which is reacted by heating the composition of claim 9 at a temperature at which a part of the uretdione rings of said uretdione compound is dissociated to react with said epoxy groups, while other uretdione rings and epoxy groups remain unreacted.

14. A thermosetting, curable resin composition according to claim 13, wherein the composition is heated to a temperature of 150° C. to 250° C. for a period of time whereby part of said composition is cured.

15. A resin composition according to claim 2, wherein said tetraphenyl borate amine complex is at least one member selected from the group consisting of:

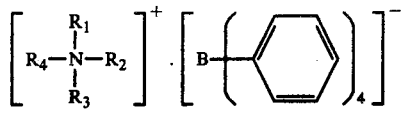

wherein at least one of groups $R_1$ to $R_4$ is an alkyl group having 1 to 20 carbon atoms and the remaining groups are hydrogen atoms;

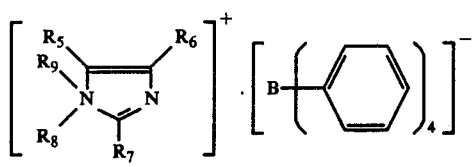

wherein at least one of groups $R_5$ to $R_9$ is an alkyl group having 1 to 20 carbon atoms or a phenyl group and the remaining groups are hydrogen atoms;

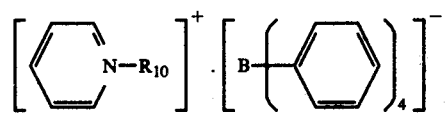

wherein $R_{10}$ is a hydrogen atom or an alkyl group having 1 to 20 carbon atoms; and

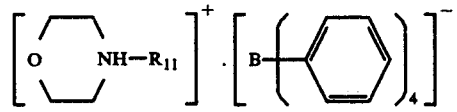

wherein $R_{11}$ is a hydrogen atom or an alkyl group having 1 to 20 carbon atoms.

16. A thermoset resin made by heating the composition of claim 10 at a temperature higher than the dissociation temperature of said tetraphenyl borate-amine complex, said resin having isocyanurate rings and oxazolidone rings in its structure.

* * * * *